United States Patent
Okazaki

(10) Patent No.: US 10,659,740 B2
(45) Date of Patent: May 19, 2020

(54) IMAGE RENDERING APPARATUS, HEAD UP DISPLAY, AND IMAGE LUMINANCE ADJUSTING METHOD

(71) Applicant: JVC KENWOOD Corporation, Yokohama, Kanagawa (JP)

(72) Inventor: Ryuichi Okazaki, Yokohama (JP)

(73) Assignee: JVCKENWOOD Corporation, Yokohama-shi (JP)

( * ) Notice: Subject to any disclaimer, the term of this patent is extended or adjusted under 35 U.S.C. 154(b) by 93 days.

(21) Appl. No.: 15/686,654

(22) Filed: Aug. 25, 2017

(65) Prior Publication Data

US 2017/0374330 A1 Dec. 28, 2017

Related U.S. Application Data

(63) Continuation of application No. PCT/JP2015/006379, filed on Dec. 22, 2015.

(30) Foreign Application Priority Data

Feb. 25, 2015 (JP) ................................ 2015-034940

(51) Int. Cl.
*H04N 9/31* (2006.01)
*B60K 35/00* (2006.01)
(Continued)

(52) U.S. Cl.
CPC ............ *H04N 9/3155* (2013.01); *B60K 35/00* (2013.01); *G01J 1/4257* (2013.01); *G01P 1/07* (2013.01);
(Continued)

(58) Field of Classification Search
None
See application file for complete search history.

(56) References Cited

U.S. PATENT DOCUMENTS 3,848,974 A * 11/1974 Hosking ............ G02B 27/0101
345/7
5,537,092 A * 7/1996 Suzuki .................... A42B 3/042
340/432
(Continued)

FOREIGN PATENT DOCUMENTS

JP 2010-139687 A 6/2010
JP 2010-175671 A 8/2010
(Continued)

OTHER PUBLICATIONS

International Search Report and Written Opinion for PCT App No. PCT/JP2015/006379 dated Mar. 8, 2016, 10 pgs.

*Primary Examiner* — Michael J Jansen, II
(74) *Attorney, Agent, or Firm* — Procopio, Cory, Hargreaves & Savitch LLP

(57) ABSTRACT

An image rendering apparatus includes a light source unit, a detecting unit, an optical scanner, a light source driving unit, and an adjusting unit. The light source driving unit is configured to control the light source unit in such a way that a rendered image is generated by the scan of the optical scanner inside a scan area scanned by the optical scanner and that a characteristic laser beam is emitted at a position and in a pattern corresponding to a rendered content of the rendered image. The rendered image includes an indicator related to a speed of a vehicle. The light source driving unit is configured to control the light source unit to emit the characteristics detecting laser beam in such a way that a scale for the indicator related to the speed of the vehicle is rendered.

12 Claims, 14 Drawing Sheets

(51) Int. Cl.
*G09G 3/02* (2006.01)
*G01P 1/07* (2006.01)
*G02B 26/10* (2006.01)
*G01J 1/42* (2006.01)
*G02B 27/01* (2006.01)
*G01J 1/32* (2006.01)
*G09G 3/34* (2006.01)

(52) U.S. Cl.
CPC ....... *G02B 26/105* (2013.01); *G02B 27/0101* (2013.01); *G09G 3/02* (2013.01); *H04N 9/3129* (2013.01); *H04N 9/3161* (2013.01); *B60K 2370/155* (2019.05); *B60K 2370/31* (2019.05); *B60K 2370/333* (2019.05); *B60K 2370/334* (2019.05); *B60K 2370/77* (2019.05); *G01J 1/32* (2013.01); *G02B 2027/014* (2013.01); *G09G 3/346* (2013.01); *H04N 9/3194* (2013.01)

(56) References Cited

U.S. PATENT DOCUMENTS

| | | | | |
|---|---|---|---|---|
| 6,097,508 | A * | 8/2000 | Hattori | G02B 26/123 358/474 |
| 6,721,634 | B1 * | 4/2004 | Hauler | B60K 35/00 340/441 |
| 7,156,522 | B2 * | 1/2007 | Plut | G03B 21/16 353/31 |
| 7,589,643 | B2 * | 9/2009 | Dagci | B60K 31/185 340/441 |
| 7,675,013 | B2 * | 3/2010 | Kobayashi | G02B 26/101 250/204 |
| 8,235,534 | B2 * | 8/2012 | Nakayama | G09G 3/3433 250/363.07 |
| 8,454,173 | B2 * | 6/2013 | Nakamura | G03B 21/14 345/1.3 |
| 8,643,926 | B2 * | 2/2014 | Wakabayashi | G02B 26/105 359/224.1 |
| 8,766,879 | B2 * | 7/2014 | Fujikawa | G02B 27/0101 345/7 |
| 8,902,130 | B2 * | 12/2014 | Furuya | G02B 5/32 345/7 |
| 9,081,184 | B2 * | 7/2015 | Yamakawa | B60K 35/00 |
| 9,134,536 | B2 * | 9/2015 | Sekiya | G02B 27/0101 |
| 9,268,134 | B2 * | 2/2016 | Wang | G09G 3/002 |
| 9,459,452 | B2 * | 10/2016 | Hada | G02B 26/0833 |
| 9,794,531 | B2 * | 10/2017 | Tabata | H04N 9/3135 |
| 9,891,426 | B2 * | 2/2018 | Yamakawa | H04N 9/3129 |
| 10,209,610 | B2 * | 2/2019 | Katou | H04N 9/3129 |
| 10,298,891 | B2 * | 5/2019 | Tabata | G09G 3/02 |
| 10,473,918 | B2 * | 11/2019 | Ohyama | H04N 5/74 |
| 10,490,112 | B2 * | 11/2019 | Ohara | H04N 9/3129 |
| 2005/0041000 | A1 * | 2/2005 | Plut | G03B 21/16 345/39 |
| 2005/0154505 | A1 * | 7/2005 | Nakamura | G01C 21/365 701/1 |
| 2006/0255243 | A1 * | 11/2006 | Kobayashi | G02B 26/101 250/208.1 |
| 2007/0001830 | A1 * | 1/2007 | Dagci | B60K 31/185 340/438 |
| 2008/0012805 | A1 * | 1/2008 | Duncan | G09G 3/3406 345/84 |
| 2010/0201894 | A1 * | 8/2010 | Nakayama | G09G 3/3433 348/745 |
| 2011/0116055 | A1 * | 5/2011 | Nakamura | G03B 21/14 353/82 |
| 2011/0279879 | A1 * | 11/2011 | Wakabayashi | G02B 26/101 359/197.1 |
| 2011/0286050 | A1 * | 11/2011 | Wakabayashi | G02B 26/101 358/474 |
| 2012/0050139 | A1 * | 3/2012 | Wang | G02B 27/01 345/7 |
| 2012/0098819 | A1 * | 4/2012 | Furuya | G02B 5/32 345/212 |
| 2013/0021224 | A1 * | 1/2013 | Fujikawa | G02B 27/0101 345/7 |
| 2014/0152711 | A1 * | 6/2014 | Sekiya | G02B 27/01 345/690 |
| 2015/0022898 | A1 * | 1/2015 | Yamakawa | B60K 35/00 359/633 |
| 2015/0092118 | A1 * | 4/2015 | Hada | B60K 35/00 349/11 |
| 2015/0260984 | A1 * | 9/2015 | Yamakawa | H04N 9/3129 345/591 |
| 2016/0342076 | A1 * | 11/2016 | Katou | H04N 9/3129 |
| 2017/0013239 | A1 * | 1/2017 | Tabata | H04N 9/3135 |
| 2017/0098400 | A1 * | 4/2017 | Yamakawa | G02B 26/10 |
| 2017/0248781 | A1 * | 8/2017 | Ohyama | H04N 5/74 |
| 2017/0332059 | A1 * | 11/2017 | Tabata | G09G 3/02 |
| 2017/0374330 | A1 * | 12/2017 | Okazaki | B60K 35/00 |
| 2018/0137797 | A1 * | 5/2018 | Ohara | G09G 3/02 |
| 2018/0196252 | A1 * | 7/2018 | Ohara | G02B 26/10 |

FOREIGN PATENT DOCUMENTS

| | | |
|---|---|---|
| JP | 2013-130832 A | 7/2013 |
| JP | 2015-225244 A | 12/2015 |
| WO | 2014162506 A1 | 10/2014 |

* cited by examiner

IMAGE RENDERING APPARATUS, HEAD UP DISPLAY, AND IMAGE LUMINANCE ADJUSTING METHOD

CROSS REFERENCE TO RELATED APPLICATION

The present application is Continuation Application of PCT Application No. PCT/JP2015/006379, filed Dec. 22, 2015, which claims the benefit of priority from Japanese Patent Application No. 2015-034940, filed on Feb. 25, 2015, the entire contents of which are hereby incorporated by reference.

BACKGROUND

The present invention relates to an image rendering apparatus, a head up display, and an image luminance adjusting method.

Laser scanning image display apparatuses that project and display images on screens by scanning laser beams two-dimensionally are well known (e.g., Japanese Unexamined Patent Application Publication No. 2010-139687). The laser scanning image display apparatuses are used for Head Up Displays (HUDs), projectors, and the like that project and display images on windshields and combiners, etc., of automobiles. In the laser scanning image display apparatus, laser beams are reflected by an MEMS mirror, an orientation of which is changed horizontally and vertically, to thereby scan the laser beams.

An image display apparatus disclosed in Japanese Unexamined Patent Application Publication No. 2010-139687 changes an amount of light from a laser light source when a gobo shields light from an MEMS mirror in such a way that an amount of light accumulated in a predetermined period will be constant. This enables the amount of light absorbed into the MEMS mirror in the predetermined period to be maintained constant even when a luminance of an image is drastically reduced. Thus, a fluctuation in a resonance frequency of the MEMS mirror can be reduced, thereby achieving stable operations.

SUMMARY

In most cases, the I-L characteristics that represent a relationship between a driving current of a laser light source and an amount of output light is easily changed by a fluctuation in the temperature of the laser light source itself. Thus, the applicant of the present application has developed an Auto Power Control (APC) technique in which a laser beam (hereinafter referred to as a characteristics detecting laser beam) for detecting an output value of the laser beam is output at an arbitrary timing from a laser light source, an amount of the laser beam is measured by a photodiode in order to obtain an actual amount of light at a predetermined driving current, and the driving current of the laser light source is adjusted based on the obtained amount of light. This reduces errors in the output values caused by fluctuations in the temperatures of laser light sources themselves.

With the APC technique, in a manner similar to the technique disclosed in Japanese Unexamined Patent Application Publication No. 2010-139687, a direction in which the characteristics detecting laser beam is output is shielded using a gobo or the like so that the characteristics detecting laser beam will not reach a range on a screen in which images are rendered for a user. At this time, stray light generated when the characteristics detecting laser beam is scattered on the gobo may reach the range on the screen in which the images are rendered. There is a problem that this stray light causes the quality of the rendered images on the screen to be reduced.

An image rendering apparatus according to this exemplary embodiment includes:

a light source unit configured to emit a laser beam;

a detecting unit configured to detect an intensity of the laser beam;

an optical scanner configured to scan the laser beam emitted from the light source unit;

a light source driving unit configured to control the light source unit in such a way that a rendered image based on input image data is generated by the scan of the optical scanner inside a scan area scanned by the optical scanner and that a characteristic laser beam for detecting the intensity of the laser beam is emitted at a position and in a pattern corresponding to a rendered content of the rendered image; and an adjusting unit configured to adjust an output of the laser beam based on a detected value of the characteristics detecting laser beam detected by the detecting unit;

wherein the rendered image includes an indicator related to a speed of a vehicle to which the image rendering apparatus is applied; and wherein the light source driving unit is configured to control the light source unit to emit the characteristics detecting laser beam in such a way that a scale for the indicator related to the speed of the vehicle is rendered.

A head up display according to this exemplary embodiment uses the above image rendering apparatus and presents a rendered image to a user by reflecting an image rendered by the image rendering apparatus by a transparent member.

An image luminance adjusting method according to this exemplary embodiment includes:

using an image rendering apparatus comprising a light source unit configured to emit a laser beam and an optical scanner configured to scan the laser beam emitted from the light source unit;

controlling the light source unit in such a way that a rendered image based on input image data is generated by the scan of the optical scanner inside a scan area scanned by the optical scanner, the rendered image includes an indicator related to a speed of a vehicle to which the image rendering apparatus is applied;

controlling the light source unit in such a way that a characteristic laser beam for detecting an intensity of the laser beam to be emitted at a position and in a pattern corresponding to a rendered content of the rendered image;

controlling the light source unit to emit the characteristics detecting laser beam in such a way that a scale for the indicator related to the engine speed of the vehicle is rendered;

detecting an intensity of the characteristics detecting laser beam; and adjusting an output of the laser beam based on a detected intensity value of the characteristics detecting laser beam.

An image rendering apparatus according to this exemplary embodiment includes:

a light source unit configured to emit a laser beam;

a detecting unit configured to detect an intensity of the laser beam;

an optical scanner configured to scan the laser beam emitted from the light source unit;

a light source driving unit configured to control the light source unit in such a way that a rendered image based on input image data is generated by the scan of the optical scanner inside a scan area scanned by the optical scanner and that a characteristic laser beam for detecting the intensity of the laser beam is emitted at a position and in a pattern corresponding to a rendered content of the rendered image; and an adjusting unit configured to adjust an output of the laser beam based on a detected value of the characteristics detecting laser beam detected by the detecting unit;

wherein the rendered image includes an indicator related to an engine speed of a vehicle to which the image rendering apparatus is applied; and wherein the light source driving unit is configured to control the light source unit to emit the characteristics detecting laser beam in such a way that a scale for the indicator related to the engine speed of the vehicle is rendered.

A head up display according to this exemplary embodiment uses the above image rendering apparatus and presents a rendered image to a user by reflecting an image rendered by the image rendering apparatus by a transparent member.

An image luminance adjusting method according to this exemplary embodiment includes:

using an image rendering apparatus comprising a light source unit configured to emit a laser beam and an optical scanner configured to scan the laser beam emitted from the light source unit;

controlling the light source unit in such a way that a rendered image based on input image data is generated by the scan of the optical scanner inside a scan area scanned by the optical scanner, the rendered image includes an indicator related to an engine speed of a vehicle to which the image rendering apparatus is applied;

controlling the light source unit in such a way that a characteristic laser beam for detecting an intensity of the laser beam to be emitted at a position and in a pattern corresponding to a rendered content of the rendered image;

controlling the light source unit to emit the characteristics detecting laser beam in such a way that a scale for the indicator related to the engine speed of the vehicle is rendered;

detecting an intensity of the characteristics detecting laser beam; and adjusting an output of the laser beam based on a detected intensity value of the characteristics detecting laser beam.

DETAILED DESCRIPTION

Figure 1:
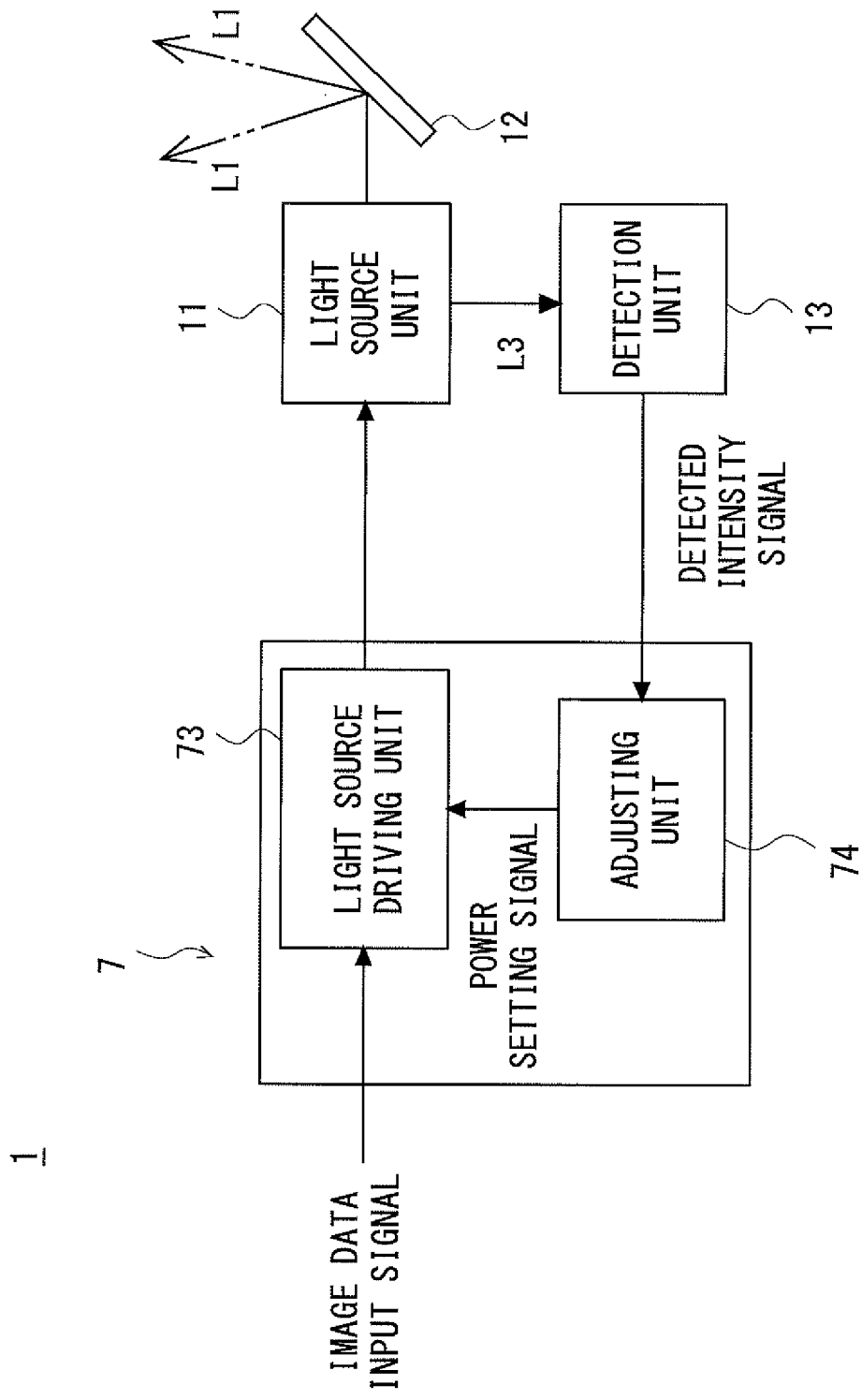
FIG. 1 is a block diagram showing a configuration of an image rendering apparatus according to an exemplary embodiment.
Figure 2:
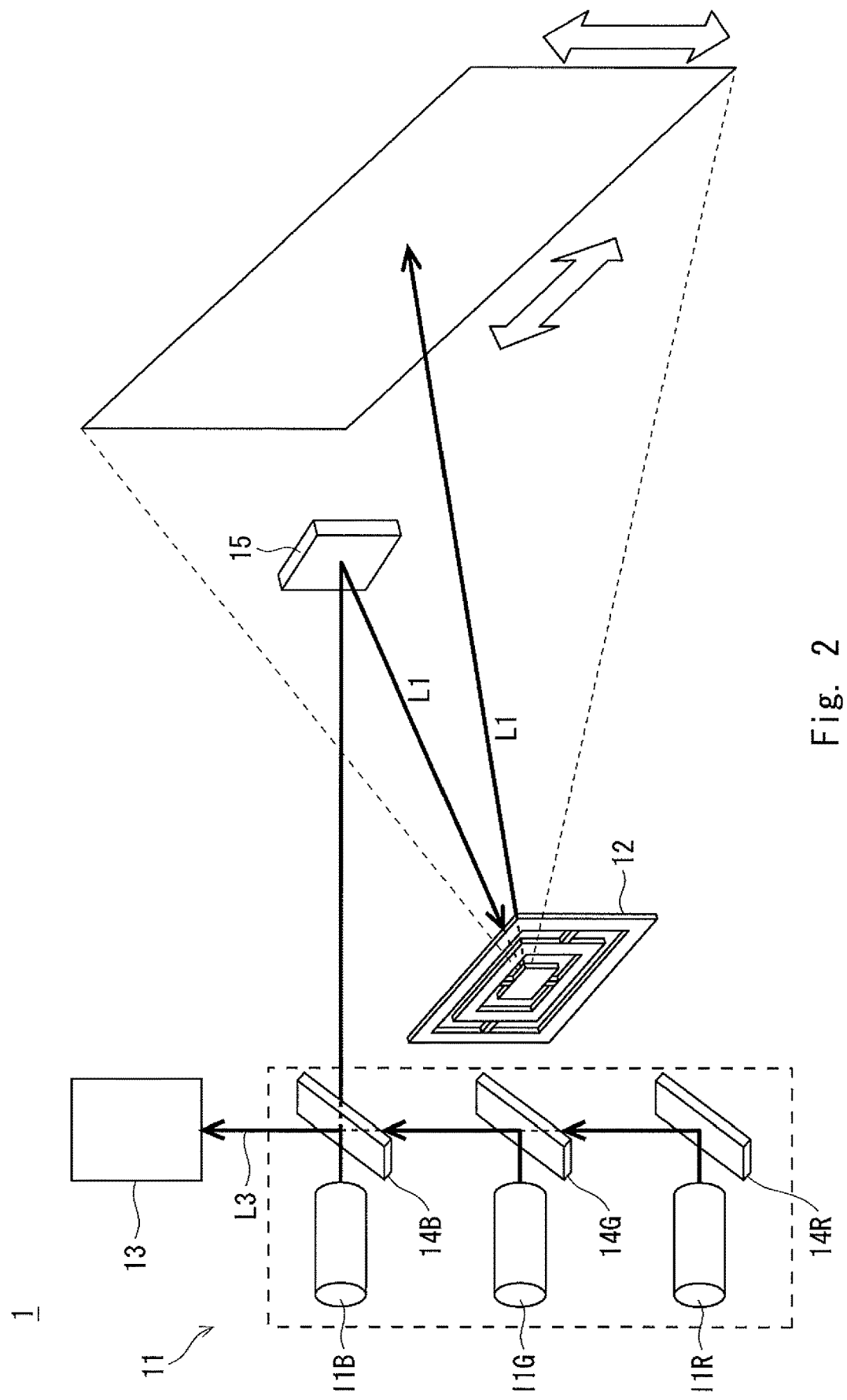
FIG. 2 is a perspective diagram showing a configuration of the image rendering apparatus according to the exemplary embodiment.

Hereinafter, exemplary embodiments will be described with reference to the drawings. As shown in FIGS. 1 and 2, an image rendering apparatus 1 according to this exemplary embodiment includes a light source unit 11, a detecting unit 13, an optical scanner 12, and a control unit 7.

The light source unit 11 outputs a laser beam according to an input current. The light source unit 11 includes three kinds of laser light sources 11R, 11G, and 11B, which are R (red), G (green), and B (blue), that can output laser beams in R, G, and B, respectively. It is obvious that the laser light sources 11R, 11G, and 11B may output laser beams in colors other than R, G, and B. For example, semiconductor lasers are used for the laser light sources 11R, 11G, and 11B.

The laser beams emitted from the laser light sources 11R, 11G, and 11B are merged into one optical path by mirrors 14R, 14G, and 14B to become a light beam L1, and the light beam L1 is emitted from the light source unit 11. For example, the mirror 14R reflects red laser beams from the laser light source 11R. The mirror 14G is a dichroic mirror that transmits red laser beams from the laser light source 11R and reflects green laser beams from the laser light source 11G. The mirror 14B is a dichroic mirror that reflects about 98% of red laser beams from the laser light source 11R and green laser beams from the laser light source 11G and transmits about 98% of blue laser beams from the laser light source 11B. In other words, the mirror 14B transmits about 2% of red laser beams from the laser light source 11R and green laser beams from the laser light source 11G and reflects about 2% of blue laser beams from the laser light source 11B.

The light beam L1 emitted from the light source unit 11 is reflected by the mirror 15 and enters the optical scanner 12. The optical scanner 12 swings the mirror in order to change a reflecting direction of the light beam L1 output from the light source unit 11 and to thereby scan the light beam L1. For example, a Micro Electro Mechanical Systems (MEMS) mirror is used for the optical scanner 12. In this exemplary embodiment, the optical scanner 12 is a scanning mirror that scans light.

The mirror 14B, which is a dichroic mirror, guides a portion of an incident light beam to the detecting unit 13, and guides a remaining portion of the incident light beam to the mirror 15. Thus, a portion of the incident light beam L1 that has entered the mirror 14B passes through the mirror 14B and becomes a light beam L3, while a remaining portion of the light beam L1 is reflected by the mirror of the optical scanner 12 and emitted to a screen.

The detecting unit 13 detects an intensity of the laser beam (the light beam L3) output from the light source unit 11. For example, a photodiode may be used for the detecting unit 13. The detecting unit 13 sends a detected intensity signal regarding a detected value of the intensity of the laser beam to an adjusting unit 74.

Figure 3:
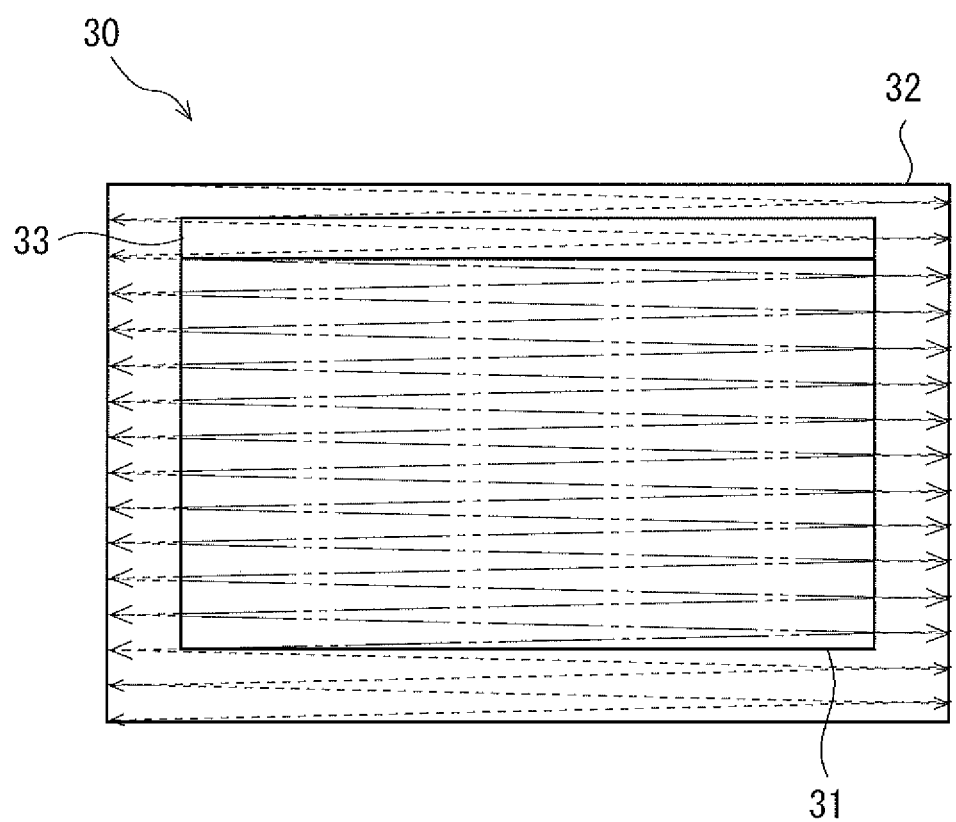
FIG. 3 is a drawing showing a scan area of the image rendering apparatus according to the exemplary embodiment.

An area in which the laser beams can be scanned by the optical scanner 12 will be referred to as a scan area. As shown in FIG. 3, a scan area 30 in which the laser beams can be scanned by the optical scanner 12 includes a rendering area 31 in which images are rendered and a blanking area 32 in which images are not rendered.

As shown in FIG. 3, the scan area 30 is rectangular. In the scan area 30, a range in which laser beams are output in order to adjust an output of the light source unit 11 is provided. Such an area is referred to as an adjusting area 33. The image rendering apparatus 1 adjusts the output of the light source unit 11 by an Auto Power Control (APC) function when irradiating the adjusting area 33 with a laser beam. A laser beam that is emitted to the adjusting area 33 in order to detect an intensity of the laser beam will be referred to as a characteristics detecting laser beam.

In FIG. 3, a laser beam is scanned in the direction indicated by the arrows. In an area indicated by the arrows of alternate long and two short dashes lines, the light source unit 11 emits a laser beam based on image data, and a user can visually recognize an image in the rendering area 31. In FIG. 3, the rendering area 31 is rectangular. The blanking area 32 is a range in the scan area 30 excluding the rendering area 31 and has a frame-like shape surrounding the rendering area 31.

The adjusting area 33 is usually provided to be accommodated inside the blanking area 32. In this exemplary embodiment, the adjusting area 33 is set at a position adjacent to the rendering area 31 or set as a rendering pattern in the rendering area 31. In the rendering area 31, the light source unit 11 is controlled to output a laser beam based on image data for each frame or on an instruction for an APC process.

Figure 4:
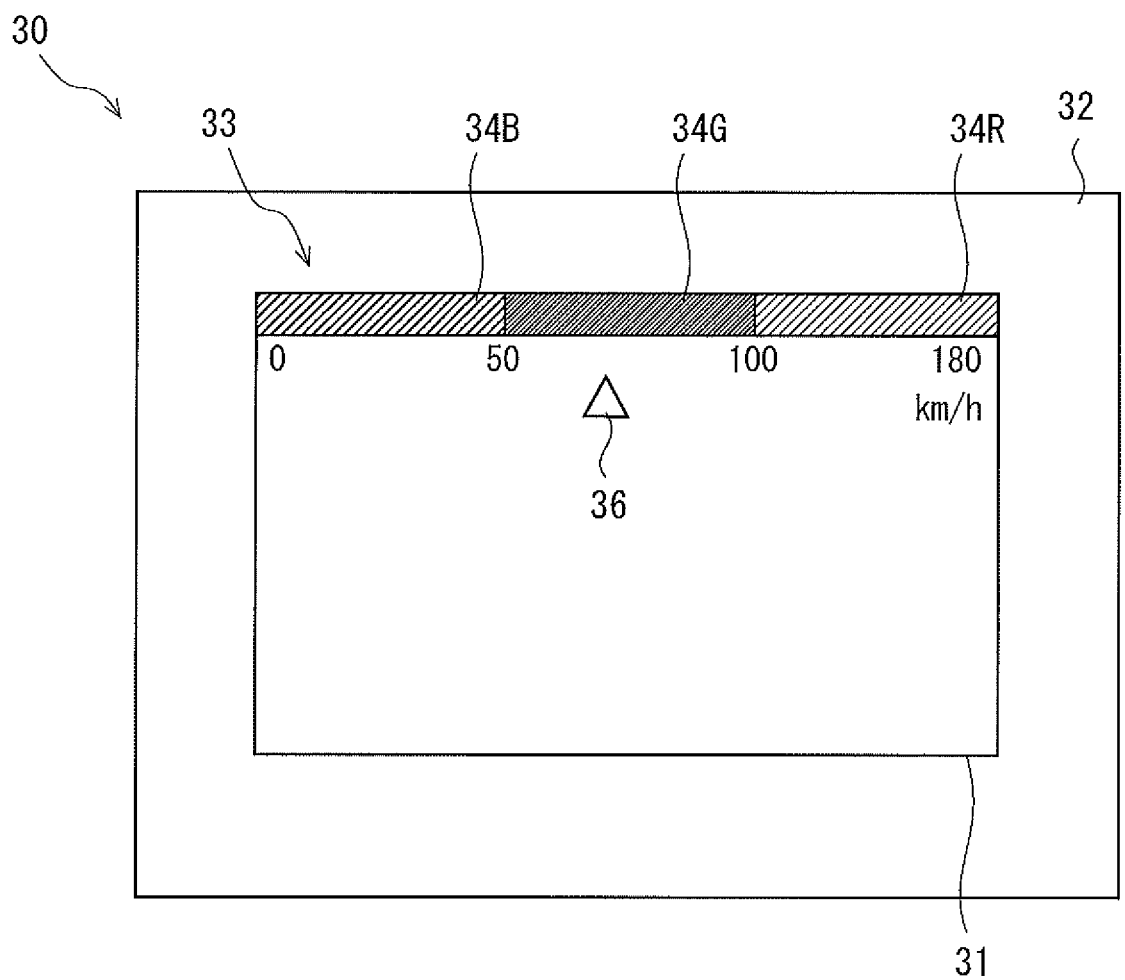
FIG. 4 is a drawing showing a first example of an arrangement of an adjusting area in the image rendering apparatus according to the exemplary embodiment.

FIG. 4 is a drawing showing a first example of an arrangement of the adjusting area 33 in the image rendering apparatus 1. In the image rendering apparatus 1, the adjusting area 33 is an area where information transmitted to a user is rendered. In FIG. 4, the adjusting area 33 is disposed at a position that is in contact with an upper end of the rendering area 31 of the blanking area 32.

As shown in FIG. 4, the adjusting area 33 includes a plurality of sectioned areas 34B, 34G, and 34R that are sectioned by respective laser light sources that adjust outputs. Laser beams corresponding to image data having a constant luminance value are emitted to the sectioned areas 34B, 34G, and 34R.

The sectioned areas 34B, 34G, and 34R are configured in such a way that colors are rendered in an order of B, G, and R from left to right in FIG. 4. APC is performed on the blue laser light source 11B in the sectioned area 34B, APC is performed on the green laser light source 11G in the sectioned area 34G, and APC is performed on the red laser light source 11R in the sectioned area 34R. In FIG. 4, different hatching patterns are used for the sectioned areas 34B, 34G, and 34R to show a difference in the colors of laser beams that are output to the sectioned areas 34B, 34G, and 34G, respectively.

In the adjusting area 33, the characteristics detecting laser beam is emitted so that a scale indicating a speed of a vehicle to which the image rendering apparatus 1 is applied is rendered. The sectioned areas 34B, 34G, and 34R correspond to predetermined speed ranges, respectively. An indicator 36 corresponding to the scale is rendered in the rendering area 31. The indicator 36 is moved along the scale inside the rendering area 31 in order to point at a position corresponding to a current speed of the vehicle.

On the scale rendered in the adjusting area 33, boundaries between the sectioned areas 34B, 34G, and 34R represent particular values. The boundary between the sectioned areas 34B and 34G represents 50 km per hour, and the boundary between the sectioned areas 34G and 34R represents 100 km per hour. A left end of the sectioned area 34B is set as 0 km per hour, which is a stopped state, and a right end of the sectioned area 34R is set as 180 km per hour, which is a maximum speed.

Figure 5:
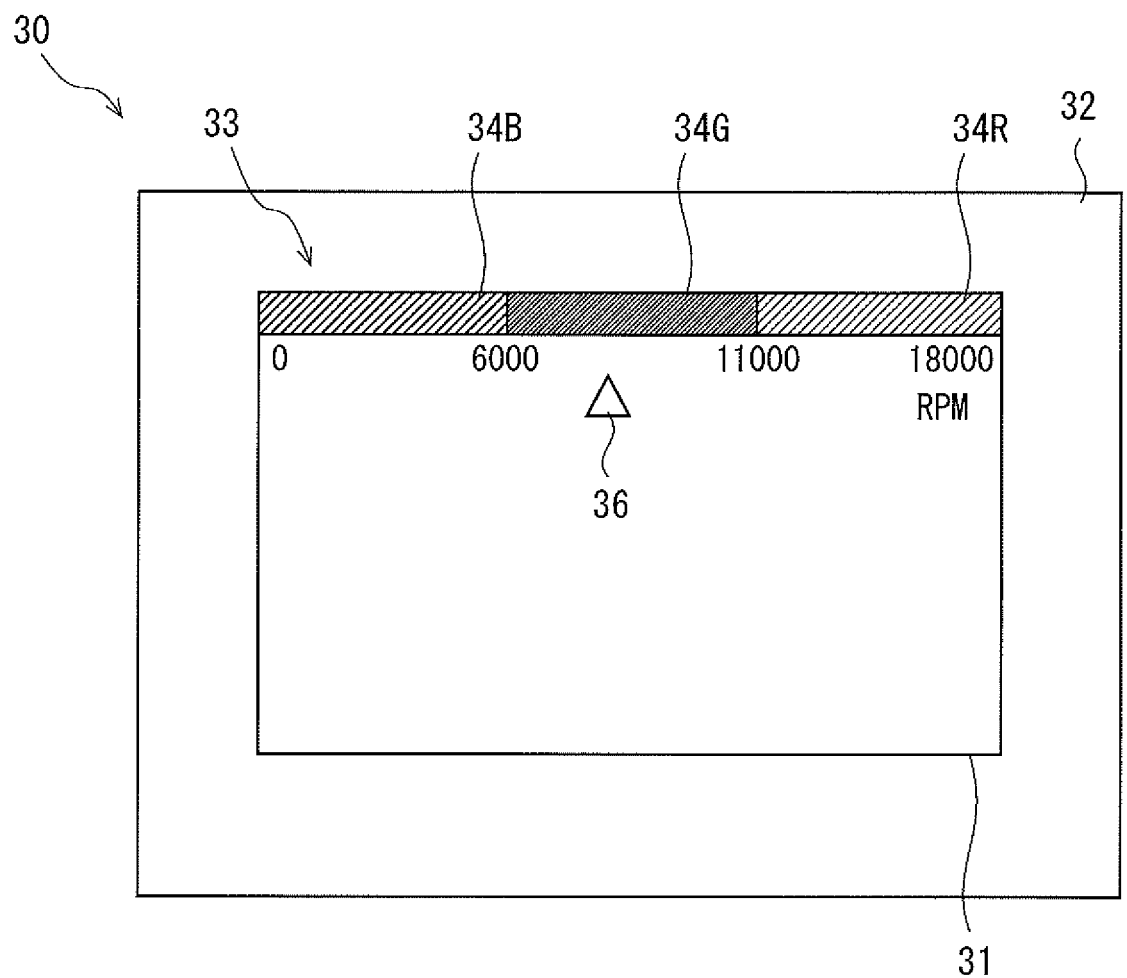
FIG. 5 is a drawing showing an example in which a scale represents an engine speed in the first example of the arrangement of the adjusting area in the image rendering apparatus according to the exemplary embodiment.

The scale may be rendered not only for a speed of the vehicle to which the image rendering apparatus 1 is applied but also for various values related to a target to which the image rendering apparatus 1 is applied. For example, as shown in FIG. 5, the scale may represent an engine speed of the vehicle to which the image rendering apparatus 1 is applied. At this time, the indicator 36 points at a position corresponding to a current engine speed on the scale.

A boundary between the sectioned areas 34B and 34G represents 6000 RPM, and a boundary between the sectioned areas 34G and 34R represents 11000 RPM. A left end of the sectioned area 34B is set as 0 RPM, which is a stopped state, and a right end of the sectioned area 34R is set as 18000 RPM, which is a maximum engine speed.

Figure 6:
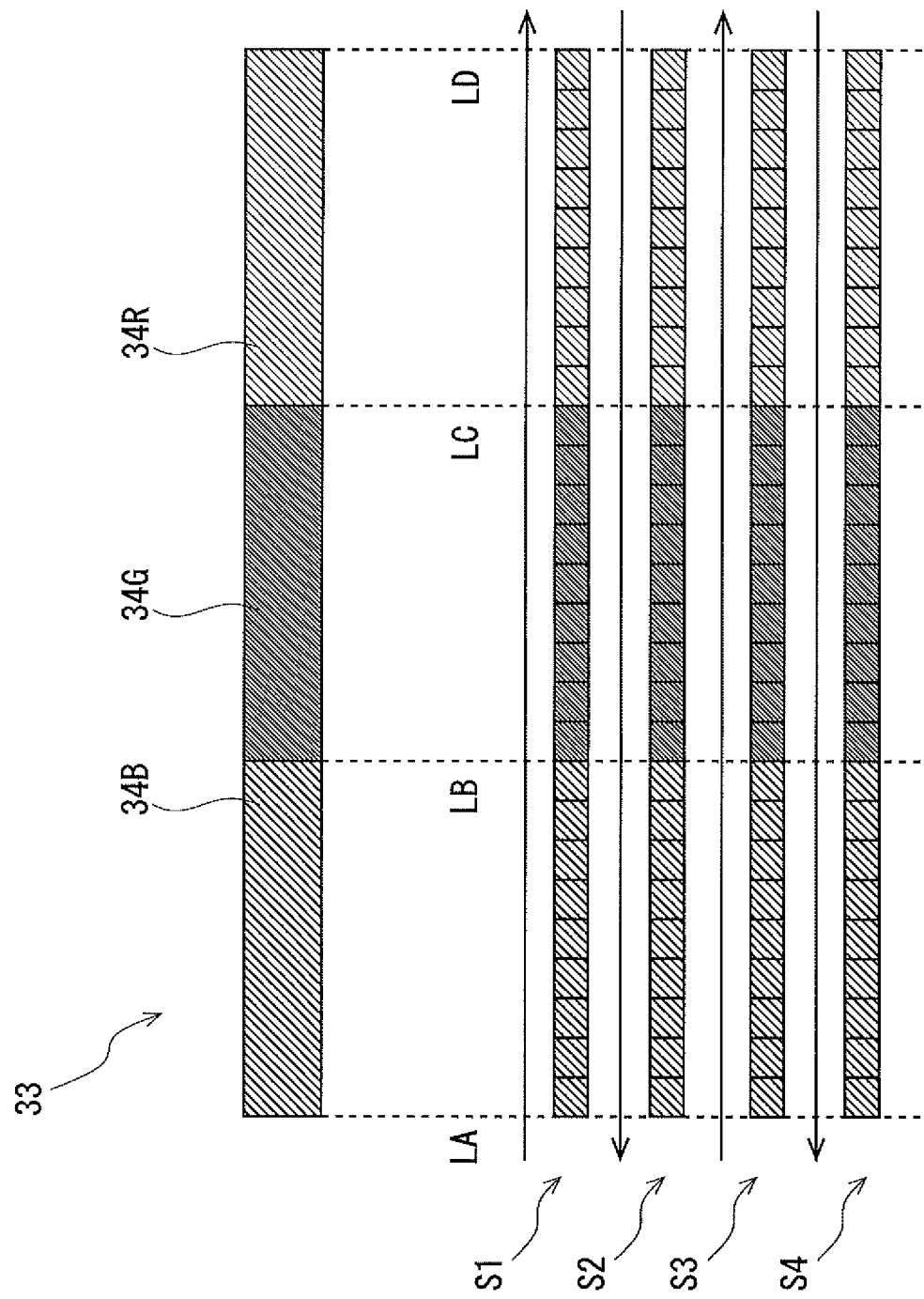
FIG. 6 is a drawing for explaining an example of the scale rendered in the adjusting area in the image rendering apparatus according to the exemplary embodiment.

As shown in FIG. 6, the adjusting area 33 is composed of a plurality of scanning lines S1 to S4. On one scanning line, the light source unit 11 emits only blue laser beams within a range from LA to LB, the light source unit 11 emits only green laser beams within a range from LB to LC, and the light source unit 11 emits only red laser beams within a range from LC to LD. The light source unit 11 repeatedly emits the laser beams as described above on the plurality of scanning lines S1 to S4 to thereby render the scale in which the section areas 34B, 34G, and 34R are arranged in an order of B, G, and R.

Figure 7:
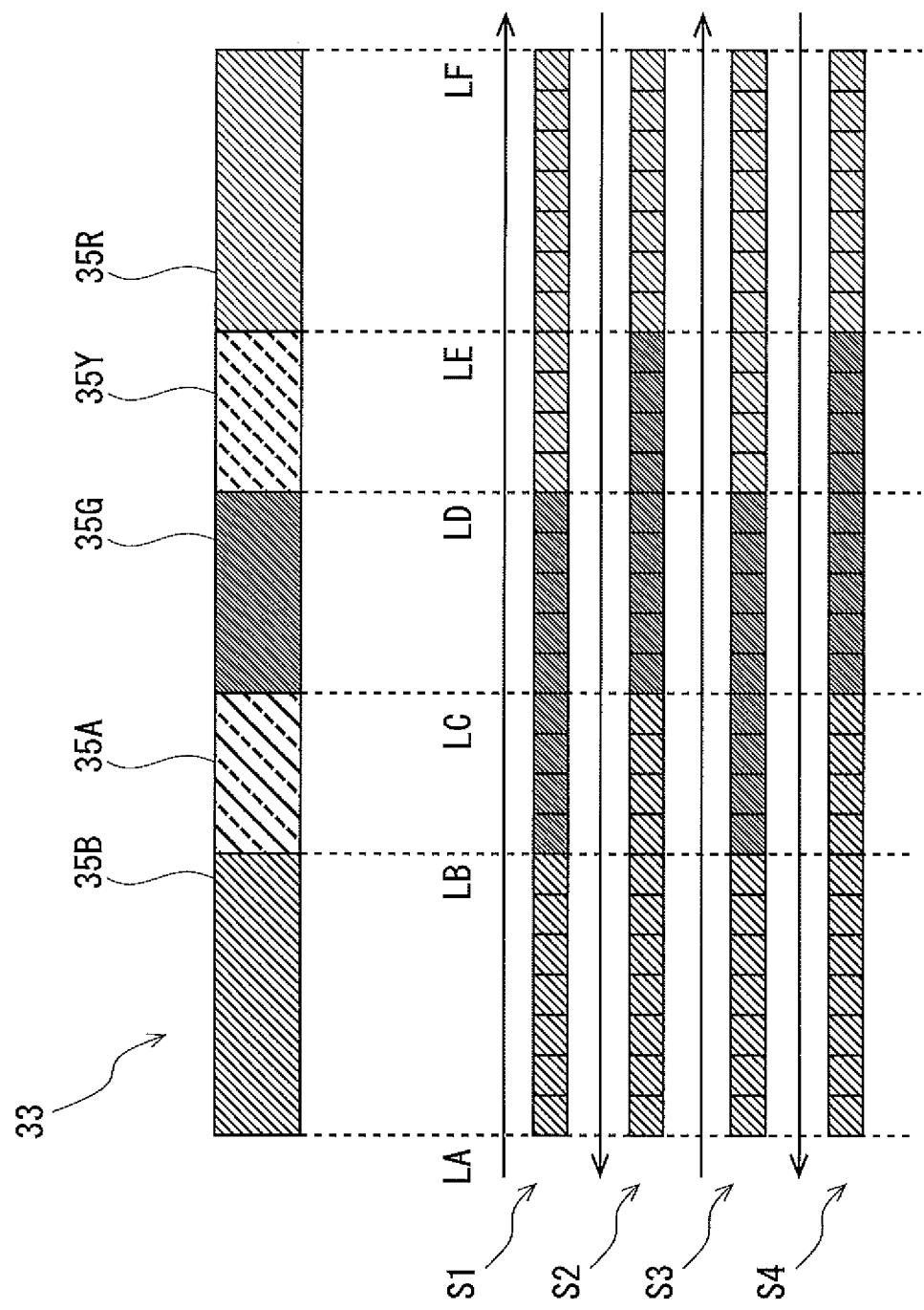
FIG. 7 is a drawing for explaining a modified example of the scale rendered in the adjusting area in the image rendering apparatus according to the exemplary embodiment.

FIG. 7 shows a modified example of the scale rendered in the adjusting area 33. As shown in FIG. 7, lengths of the B, G, and R sectioned areas in a main scan direction may differ among the scanning lines S1 to S4. The plurality of sectioned areas on the scanning lines S1 to S4 may be partially nested, by which the plurality of sectioned areas on the upper and lower scanning lines are made to partially overlap in the main scanning direction.

On the scanning lines S1 and S3, the light source unit 11 emits only blue laser beams in the sectioned area within a range from LA to LB, the light source unit 11 emits only green laser beams in the sectioned area within a range from LB to LD, and the light source unit 11 emits only red laser beams in the sectioned area within a range from LD to LF.

On the other hand, on the scanning lines S2 and S4, the light source unit 11 emits only blue laser beams in the sectioned area within a range from LA to LC, the light source unit 11 emits only green laser beams in the sectioned area within a range from LC to LE, and the light source unit 11 emits only red laser beams in the sectioned area within a range from LE to LF.

In an area 35B of the scale corresponding to the range from LA to LB, the light source unit 11 emits only blue laser beams on all of the scanning lines S1 to S4, and blue is rendered therein. In an area 35G of the scale corresponding to the range from LC to LD, the light source unit 11 emits only green laser beams on all of the scanning lines S1 to S4, and green is rendered therein. In an area 35R of the scale corresponding to the range from LE to LF, the light source unit 11 emits only red laser beams on all of the scanning lines S1 to S4, and red is rendered therein.

In the range from LB to LC, the light source unit 11 emits only green laser beams on the scanning lines S1 and S3, and the light source unit 11 emits only blue laser beams on the scanning lines S2 and S4. Then, in an area 35A of the scale corresponding to the range from LB to LC, the blue and green laser beams are mixed, and sky blue is rendered therein.

In the range from LD to LE, the light source unit 11 emits only red laser beams on the scanning lines S1 and S3, and the light source unit 11 emits only green laser beams on the scanning lines S2 and S4. In an area 35Y of the scale corresponding to the range from LD to LE, the green and red laser beams are mixed, and yellow is rendered therein.

Thus, the image rendering apparatus 1 can increase the sections of the scale without losing the function of the adjusting area 33 used for APC.

Figure 8:
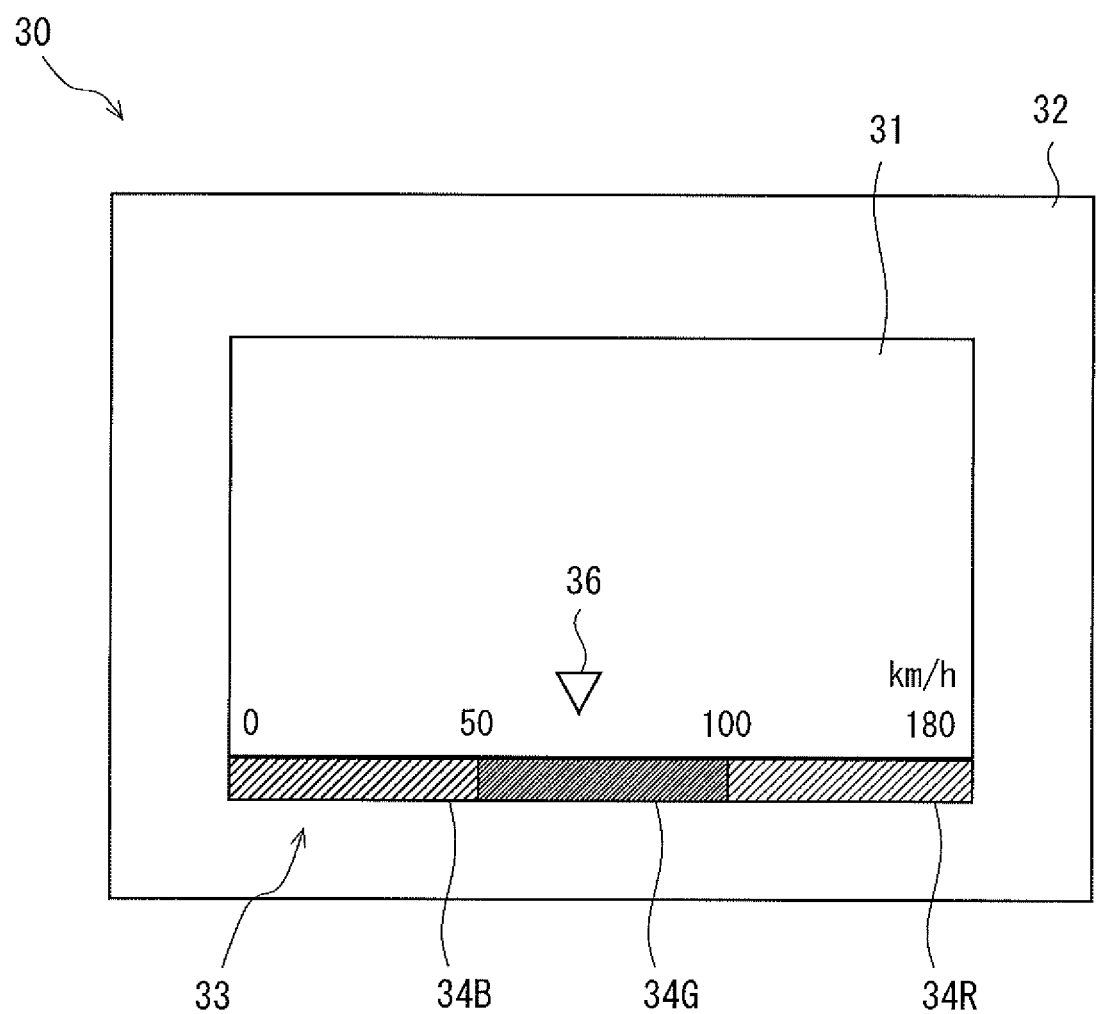
FIG. 8 is a drawing showing a second example of the arrangement of the adjusting area in the image rendering apparatus according to the exemplary embodiment.

The arrangement of the adjusting area 33 in the scan area 30 is not limited to the configuration of FIG. 4, and various other aspects can be considered. As shown in FIG. 8, the adjusting area 33 may be disposed to be in contact with a lower part of the rendering area 31 in the blanking area 32.

Figure 9:
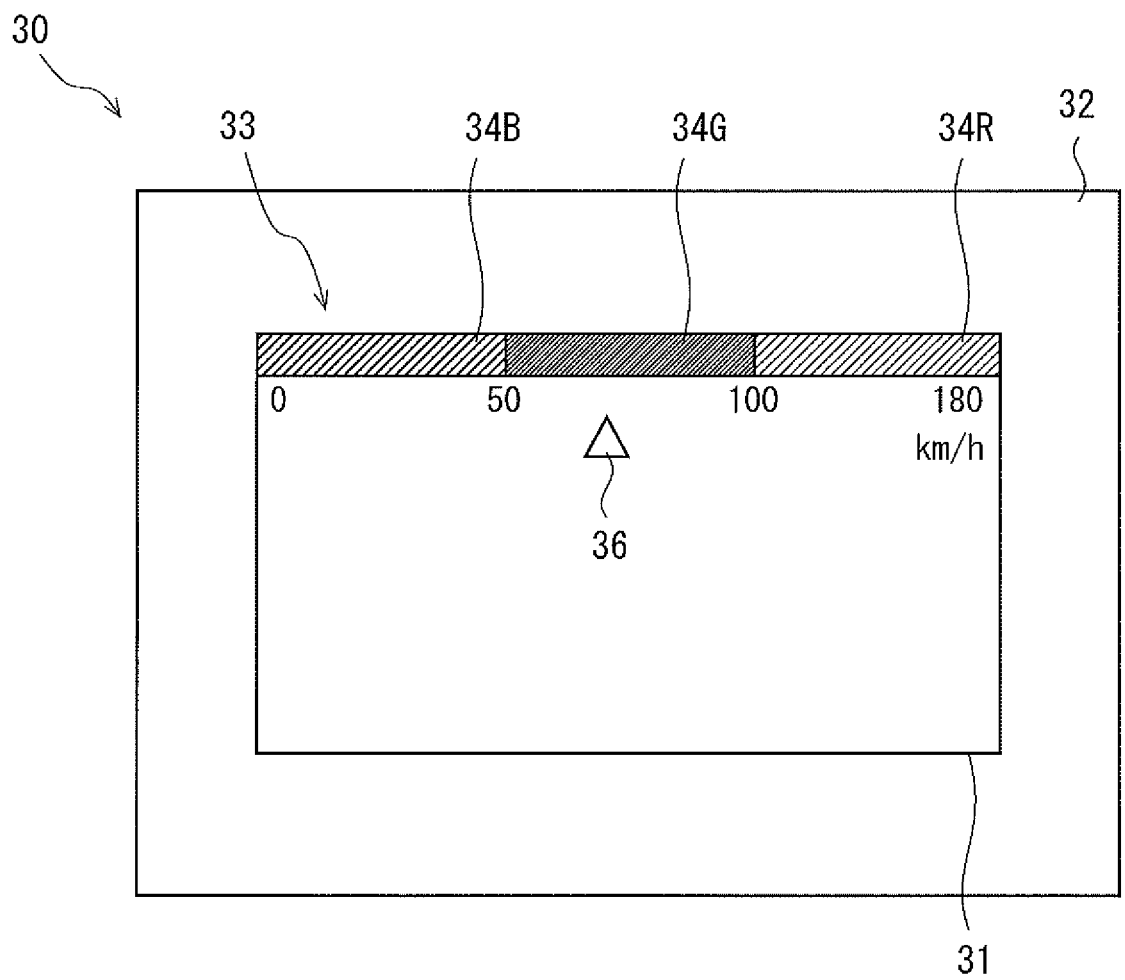
FIG. 9 is a drawing showing a third example of the arrangement of the adjusting area in the image rendering apparatus according to the exemplary embodiment.
Figure 10:
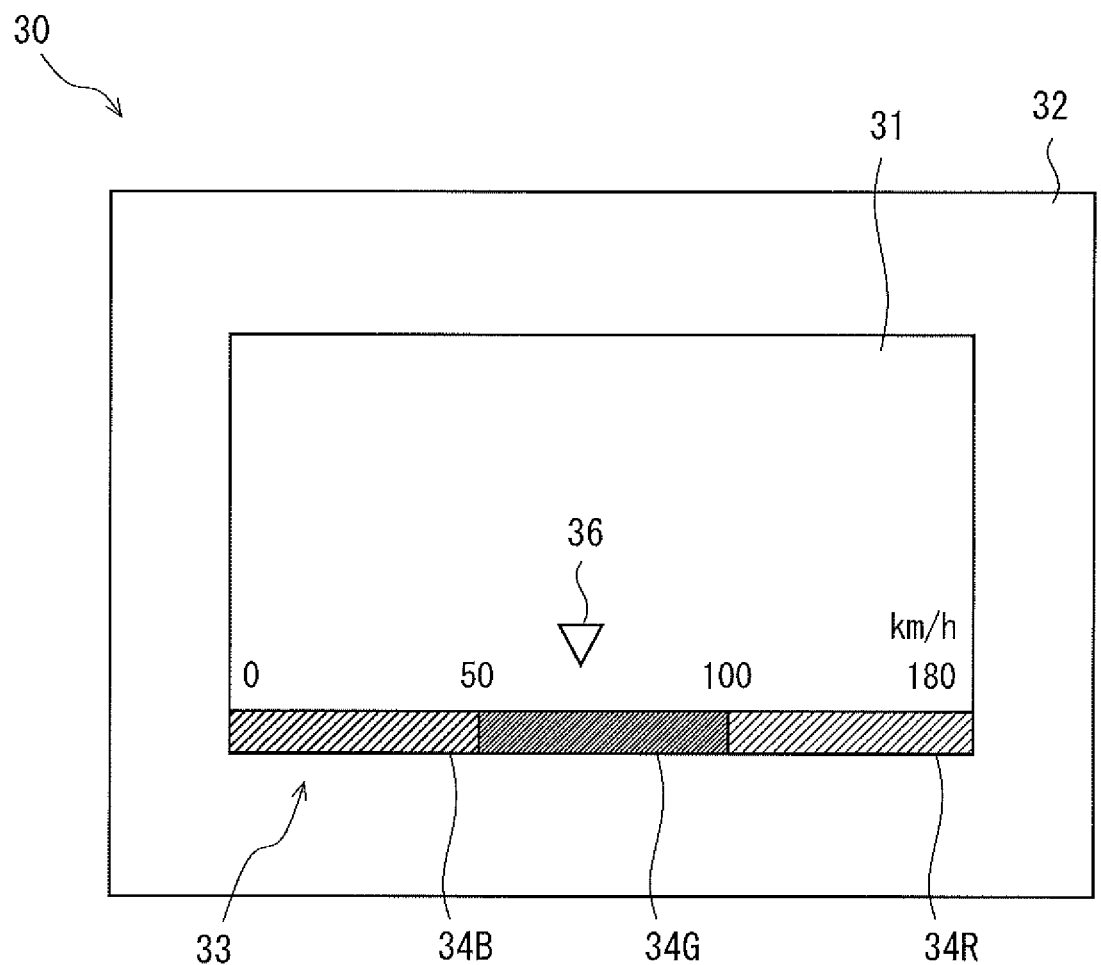
FIG. 10 is a drawing showing a fourth example of the arrangement of the adjusting area in the image rendering apparatus according to the exemplary embodiment.
Figure 11:
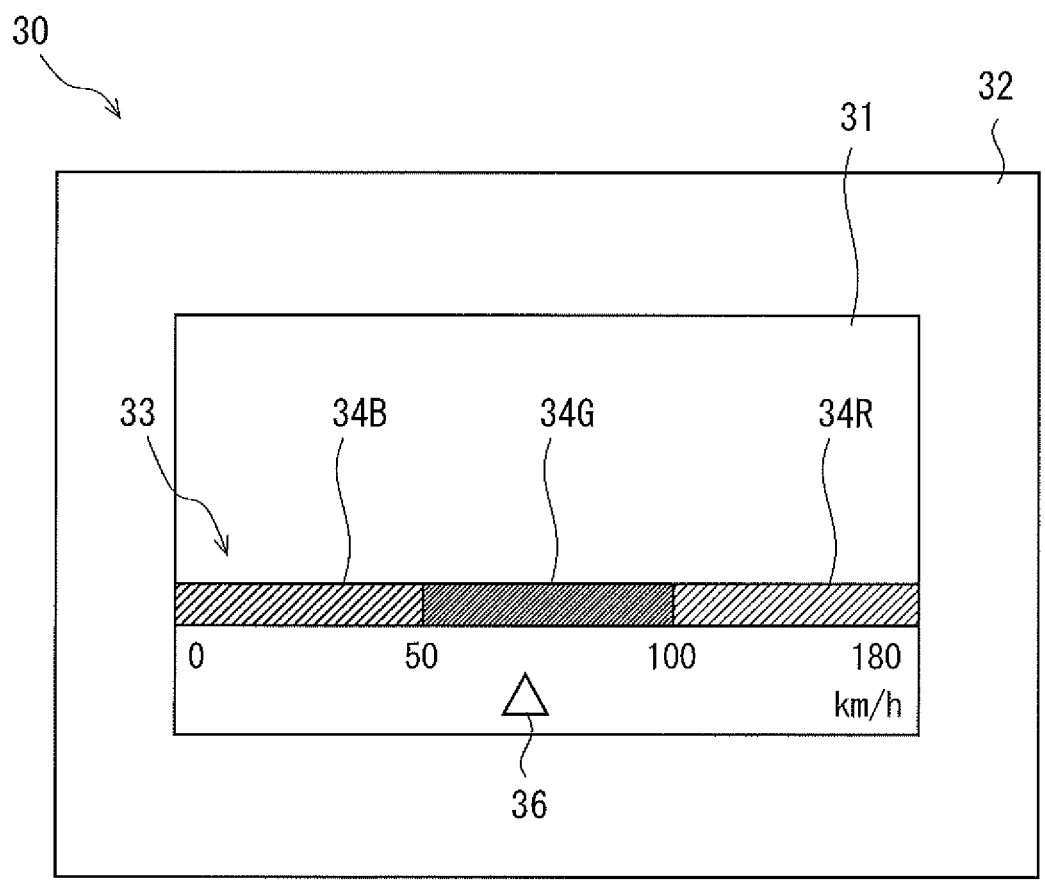
FIG. 11 is a drawing showing a fifth example of the arrangement of the adjusting area in the image rendering apparatus according to the exemplary embodiment.

The position where the adjusting area 33 is disposed is not limited to inside the blanking area 32. For example, the adjusting area 33 may be included inside the rendering area 31. As shown in FIG. 9, the adjusting area 33 may be disposed to be in contact with a lower part of the blanking area 32 in an upper part of the rendering area 31. As shown in FIG. 10, the adjusting area 33 may be disposed to be in contact with an upper part of the blanking area 32 in a lower part of the rendering area 31. As shown in FIG. 11, the adjusting area 33 may be disposed in such a way that the adjusting area 33 is not in contact with upper and lower parts of the blanking area 32 inside the rendering area 31.

When the adjusting area 33 is disposed as in FIGS. 9 to 11, rendering data for rendering the scale may be included in the image data for rendering an image in the rendering area 31. In this case, an output value of the characteristics detecting laser beam is supplied as data for rendering the adjusting area 33 in the image data.

Figure 12:
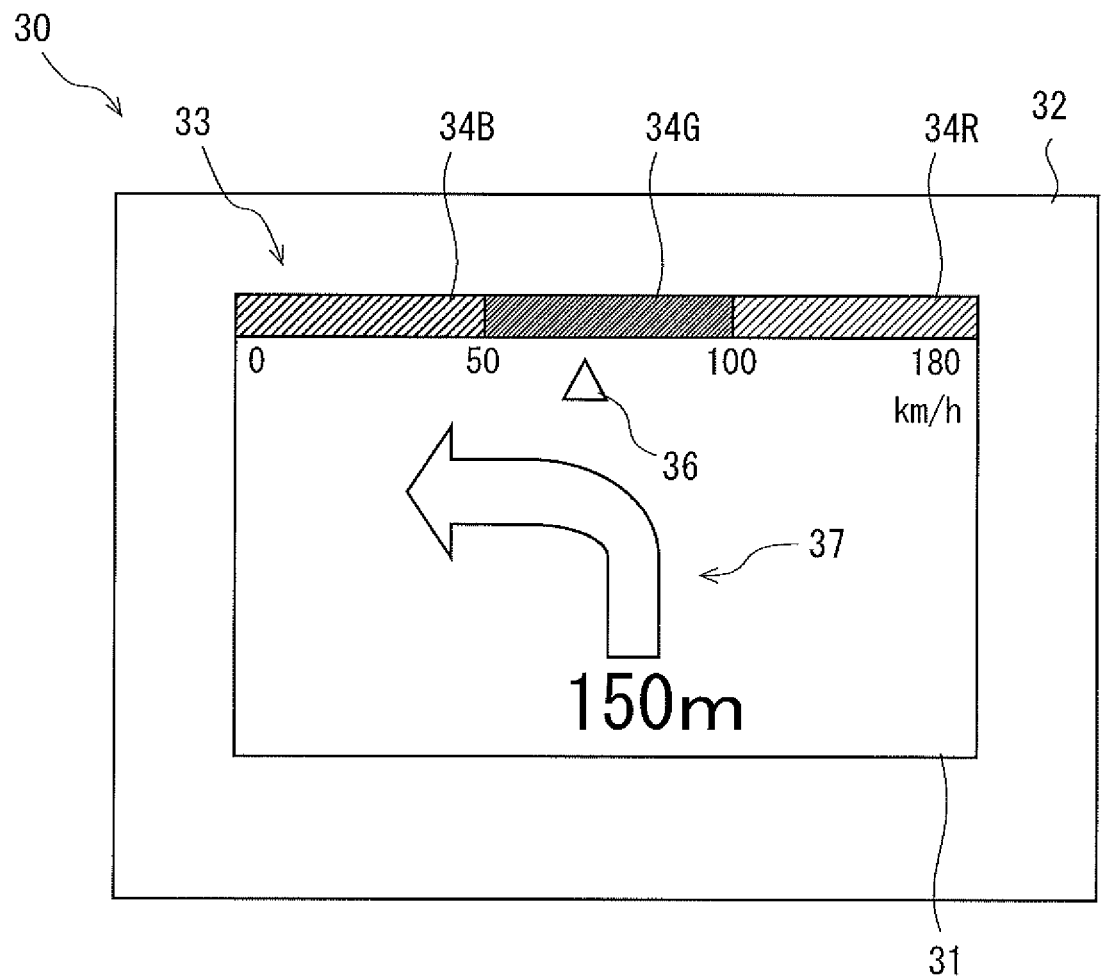
FIG. 12 is a drawing showing an example of a rendered image in the image rendering apparatus according to the exemplary embodiment.

As shown in FIG. 12, other information can be rendered in an area inside the rendering area 31 where information related to the scale is not drawn. For example, a simple direction indicating shape linked with navigation may be rendered in such an area. In FIG. 12, a direction indicating shape 37 that indicates a left turn at 150 m ahead is rendered.

As shown in FIG. 1, the control unit 7 includes the adjusting unit 74 and a light source driving unit 73. The control unit 7 may be achieved by hardware such as a Field Programmable Gate Array (FPGA) or achieved by a program stored in an external storage device and a Central Processing Unit (CPU).

The adjusting unit 74 adjusts outputs of the plurality of laser light sources based on intensities of laser beams, which are detected by the detection unit 13 and are emitted to the respective plurality of sectioned areas 34B, 34G, and 34R. The adjusting unit 74 adjusts the outputs of the plurality of laser light sources in such a way that detected values corresponding to the respective plurality of sectioned areas 34B, 34G, and 34R detected by the detecting unit 13 will become target values. The light source driving unit 73 drives the light source unit 11 based on a result of the adjustment by the adjusting unit 74 in order to control the light source unit 11 to output light according to image data that constitutes an image.

The image rendering apparatus 1 includes an APC function that adjusts currents to be input to the light source unit 11 in such a way that the detected values of the detecting unit 13 will be constant. Processes by the control unit 7 when the image rendering apparatus 1 performs APC will be described by referring to FIG. 1.

The adjusting unit 74 adjusts the output of the light source unit 11 in such a way that the detected value of the detecting unit 13 will become the target value. The adjusting unit 74 sends a power setting signal to the light source driving unit 73. The power setting signal specifies an amount of current which will be input to the light source unit 11. The adjusting unit 74 changes the amount of current which will be input to the light source unit 11 based on the laser beam output to the adjusting area 33 shown in FIG. 3 to thereby adjust the output of the light source unit 11.

The light source driving unit 73 drives the light source unit 11 based on the result of the adjustment by the adjusting unit 74 in order to output light according to the image data. Then, in the rendering area 31, the light source unit 11 emits light with a light intensity that enables the image to be appropriately rendered based on RGB data in the image data. Further, the light source driving unit 73 controls the light source unit 11 to output the characteristics detecting laser beam that has a predetermined output value while irradiating the adjusting area 33 with the laser beam and to emit light in such a way that the amount of light detected value of the detecting unit 13 will become the target value.

Figure 13:
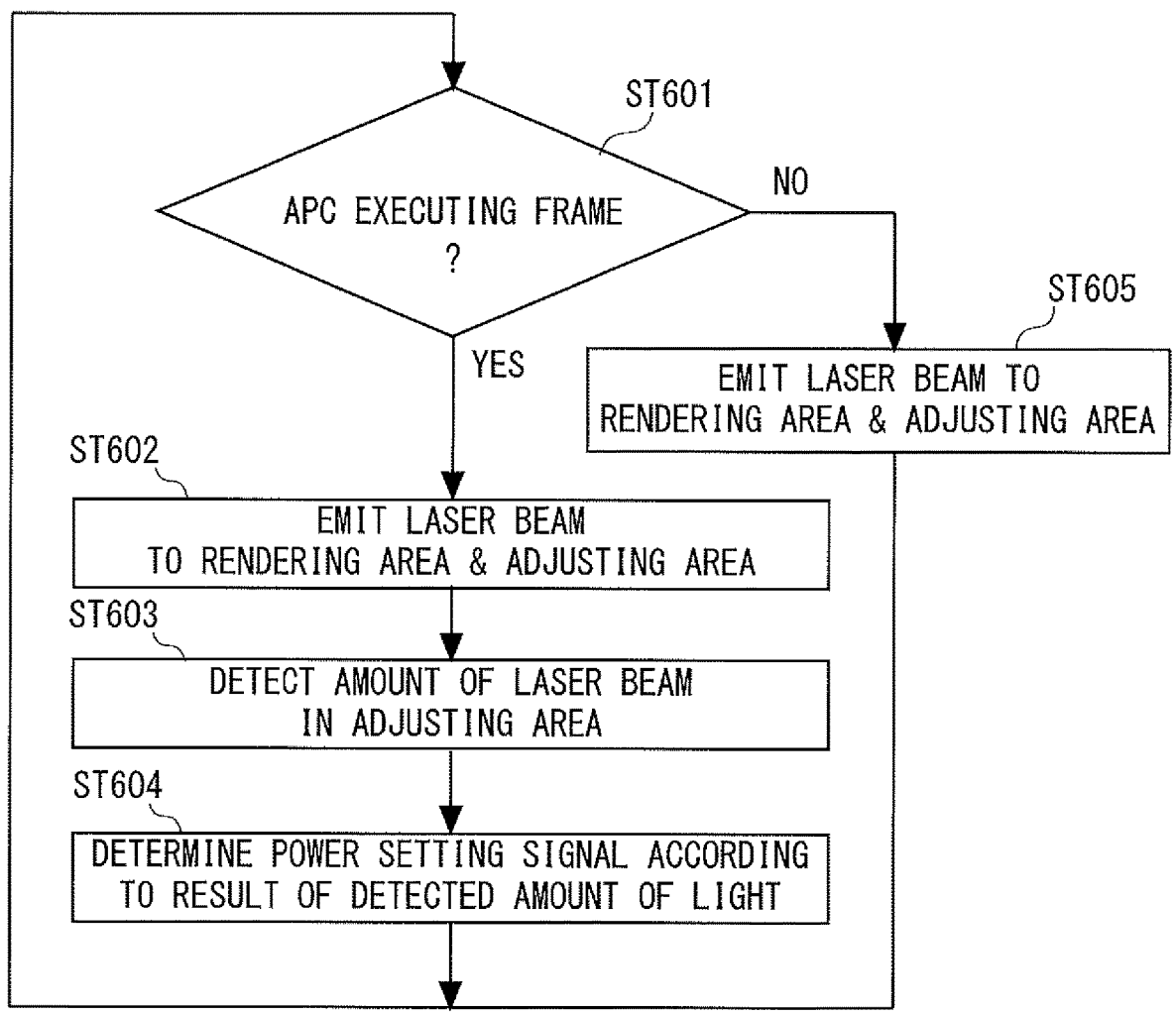
FIG. 13 is a flowchart showing an image luminance adjusting method performed by the image rendering apparatus according to the exemplary embodiment.

An image luminance adjusting method using the image rendering apparatus 1 will be described by referring to FIG. 13.

The light source driving unit 73 evaluates as to whether or not a frame to be rendered next is a frame on which APC is executed (ST601). If the frame to be rendered next is not a frame on which APC is executed (ST601 NO), the light source driving unit 73 performs control so that a laser beam is emitted in the rendering area 31 and the adjusting area 33 to thereby render an image including the predetermined indicator 36 in the rendering area 31 and render a scale for the indicator 36 in the adjusting area 33 (ST605). At this time, APC is not performed in the adjusting area 33, and normal rendering is performed. In the example shown in FIGS. 4 and 5, the light source driving unit 73 performs control so that an image is rendered in the rendering area 31 after rendering in the adjusting area 33 is completed. Further, in the example shown in FIG. 8, the light source driving unit 73 performs control so that an image is rendered in the adjusting area 33 after rendering in the rendering area 31 is completed. Furthermore, in the examples shown in FIGS. 9 to 11, the light source driving unit 73 performs control so that rendering is performed in the adjusting area 33 during rendering in the rendering area 31.

In ST601, if the frame to be rendered next is a frame on which APC is executed (ST601 YES), the light source driving unit 73 controls a laser beam to be emitted in a manner similar to the process in ST605 (ST602). At this time, the adjusting unit 74 detects an intensity of the laser beam to be emitted in the adjusting area 33 (ST603).

Next, the adjusting unit 74 determines a magnitude of the power setting signal based on a result of the adjustment (ST604). The light source driving unit 73 drives the light source unit 11 based on the power setting signal that is based on the result of the adjustment to thereby emit a laser beam with an appropriate amount of light in the rendering of the rendering area 31 from the rendering of the adjusting area 33 onward or the rendering of the next frame.

With such a configuration, the image rendering apparatus 1 projects the characteristics detecting laser beam used for APC on the screen without shielding the characteristics detecting laser beam by a gobo. Accordingly, the characteristics detecting laser beam will neither be scattered by the gobo nor scattered light enters rendered images thereby preventing deterioration in the quality of the rendered images, which is caused by irradiation of the characteristics detecting laser beam.

Moreover, as the image rendering apparatus 1 does not include a gobo for shielding the characteristics detecting laser beam used for APC, it requires a small number of parts, and thus the manufacturing cost can be reduced.

In addition, as the image rendering apparatus 1 does not shield the characteristics detecting laser beam by a gobo, the characteristics detecting laser beam is projected on the screen, and thus a user can visually recognize rendering by the characteristics detecting laser beam. Therefore, the image rendering apparatus 1 according to this exemplary embodiment renders images for providing the user with information by the characteristics detecting laser beam, so that the user will not feel uncomfortable with the characteristics detecting laser beam.

As has been described above, according to the image rendering apparatus 1 of this exemplary embodiment, it is possible to provide an image rendering apparatus that can prevent reduction of the quality of rendered images, which is caused by irradiation of a laser beam for detecting an output value of a laser light source.

Figure 14:
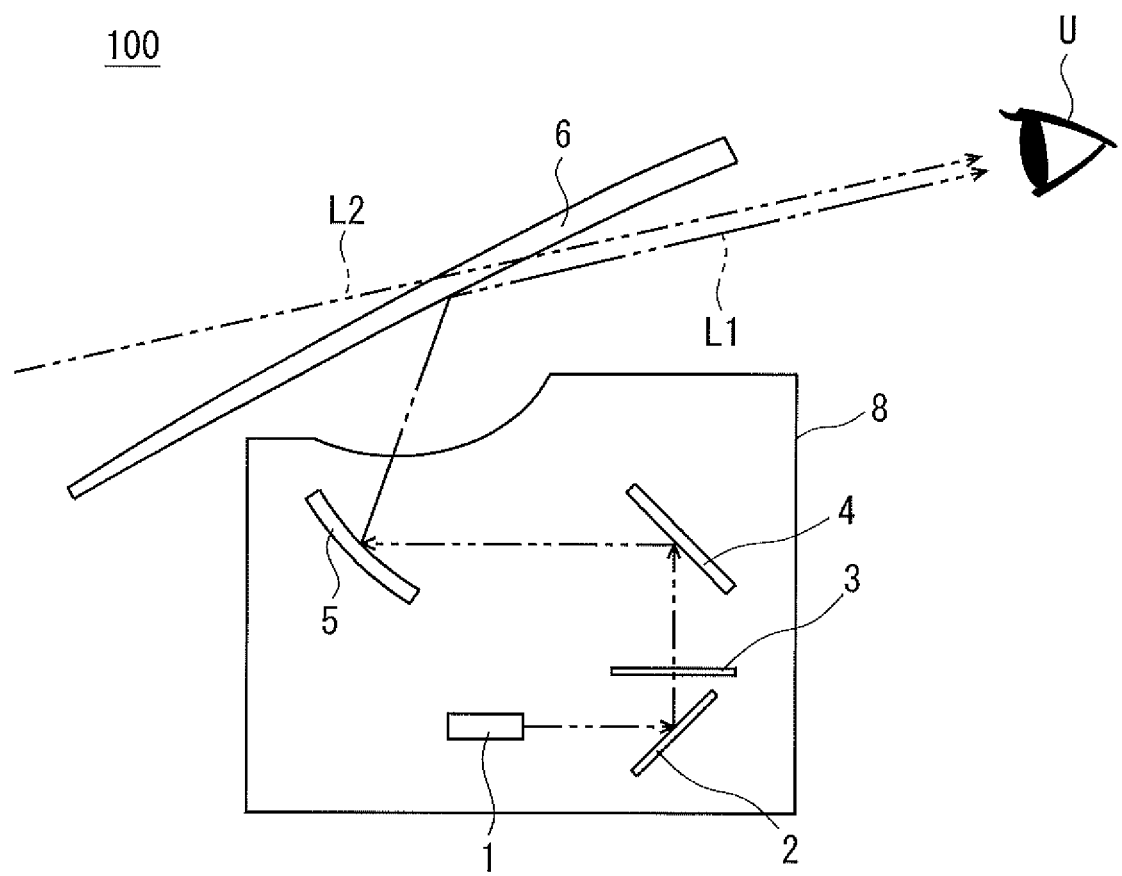
FIG. 14 is a drawing showing a configuration of a head up display according to the exemplary embodiment.

A head up display 100 using the image rendering apparatus 1 according to this exemplary embodiment will be described below. Firstly, a configuration of the head up display 100 will be described by referring to FIG. 14. As shown in FIG. 14, the head up display 100 includes the image rendering apparatus 1, a first planar mirror 2, a screen 3, a second planar mirror 4, a concave mirror 5, a projecting unit 6, and an enclosure 8.

An optical path for a light beam L1 emitted from the image rendering apparatus 1 to reach eyes of a user U will be described by referring to FIG. 14. The light beam L1 emitted from the image rendering apparatus 1 is reflected by the first planar mirror 2, the optical path of the light beam L1 is bent, and then the light beam L1 enters the screen 3. The light beam L1 forms an intermediate image of the rendered image on the screen 3. The screen 3 is a light transmissive screen. For example, a diffuser or a microlens array is used for the screen 3. The microlens array includes microlenses arranged in a matrix. The microlens has an effect of reducing speckles of laser beams and is designed to optimize an emission angle and color non-uniformity.

The light beam L1 emitted from the screen 3 is reflected by the second planar mirror 4, the optical path of the light beam L1 is bent, and then the light beam L1 enters the concave mirror 5. The light beam L1 reflected by the concave mirror 5 is emitted outside the enclosure 8 and enters the projecting unit 6. The projecting unit 6 reflects a portion of the incident light beam and transmits a remaining portion of the incident light beam. The projecting unit 6 is a transparent member that presents images to a user. A combiner or a windshield of an automobile may be used for the projecting unit 6.

In the head up display 100, the light beam L1 emitted from an opening of the enclosure 8 and reflected by the projecting unit 6 and a light beam L2 passed through the projecting unit 6 are made to overlap by the projecting unit 6 and directed to the user U. From the user U's view, the user U can see an image rendered on the image rendering apparatus 1, which is a virtual image, through scenery on the projecting unit 6.

Note that the present invention is not limited to the above exemplary embodiments, and various modifications can be made without departing from the scope of the invention. For example, the optical scanner 12 is not limited to a scanning mirror such as an MEMS mirror, a Galvano mirror, or the like and may instead be an optical scanner using the electro-optic effect.

What is claimed is:

1. An image rendering apparatus comprising:
   a light source unit configured to emit a laser beam;
   a detecting unit configured to detect an intensity of the laser beam;
   an optical scanner configured to scan the laser beam emitted from the light source unit in a scan area, the scan area having a rendering area and a blanking area;
   a light source driving unit configured to control the light source unit in such a way (i) that a rendered image based on input image data is generated by the scan of the optical scanner inside the rendering area of the scan area scanned by the optical scanner and not in the blanking area, and (ii) that a characteristic laser beam for detecting the intensity of the laser beam is emitted to at least an adjusting area at a position in the rendering area and in a pattern corresponding to a rendered content of the rendered image; and
   an adjusting unit configured to adjust an output of the laser beam based on a detected value of the characteristics detecting laser beam emitted in at least the adjusting area detected by the detecting unit;
   wherein the rendered image includes an indicator related to a speed of a vehicle to which the image rendering apparatus is applied;
   wherein the light source driving unit is configured to control the light source unit to emit the characteristics detecting laser beam in such a way that a scale for the indicator related to the speed of the vehicle is rendered within the adjusting area;
   wherein the light source unit includes a plurality of laser light sources configured to emit laser light of a plurality of colors; and
   wherein the scale comprises a plurality of sectioned areas rendered by the characteristics detecting laser beam in the adjusting area within the rendering area, a color of each respective sectioned area corresponding to a color of the laser light source.

2. The image rendering apparatus according to claim 1, wherein
   the light source driving unit is configured to control the light source unit to emit the characteristics detecting laser beam at the position and in the pattern corresponding to the rendered content of the rendered image for the respective laser light sources.

3. The image rendering apparatus according to claim 2, wherein the light source driving unit is configured to control the light source unit to emit the characteristics detecting laser beam with a luminance value based on the input image data.

4. The image rendering apparatus according to claim 1, wherein the light source driving unit controls the light source unit to emit the characteristics detecting laser beam at a position and in a pattern that constitutes a part of the rendered image.

5. A head up display that uses the image rendering apparatus according to claim 1 and presents a rendered image to a user by reflecting an image rendered by the image rendering apparatus by a transparent member.

6. An image luminance adjusting method comprising:
using an image rendering apparatus comprising a light source unit configured to emit a laser beam, a detecting unit configured to detect an intensity of the laser beam, and an optical scanner configured to scan the laser beam emitted from the light source unit in a scan area, the scan area having a rendering area and a blanking area;
controlling the light source unit in such a way that a rendered image based on input image data is generated by the scan of the optical scanner inside the rendering area of the scan area scanned by the optical scanner and not in the blanking area, the rendered image includes an indicator related to a speed of a vehicle to which the image rendering apparatus is applied;
controlling the light source unit in such a way that a characteristic laser beam for detecting an intensity of the laser beam to be emitted to at least an adjusting area at a position in the rendering area and in a pattern corresponding to a rendered content of the rendered image;
controlling the light source unit to emit the characteristics detecting laser beam in such a way that a scale for the indicator related to the engine speed of the vehicle is rendered within the adjusting area;
detecting an intensity of the characteristics detecting laser beam; and
adjusting an output of the laser beam based on a detected intensity value of the characteristics detecting laser beam emitted in at least the adjusting area;
wherein the light source unit includes a plurality of laser light sources configured to emit laser light of a plurality of colors; and
wherein the scale comprises a plurality of sectioned areas rendered by the characteristics detecting laser beam in the adjusting area within the rendering area, a color of each respective sectioned area corresponding to a color of the laser light source.

7. An image rendering apparatus comprising:
a light source unit configured to emit a laser beam;
a detecting unit configured to detect an intensity of the laser beam;
an optical scanner configured to scan the laser beam emitted from the light source unit in a scan area, the scan area having a rendering area and a blanking area;
a light source driving unit configured to control the light source unit in such a way (i) that a rendered image based on input image data is generated by the scan of the optical scanner inside the rendering area of the scan area scanned by the optical scanner and not in the blanking area, and (ii) that a characteristic laser beam for detecting the intensity of the laser beam is emitted to at least an adjusting area at a position in the rendering area and in a pattern corresponding to a rendered content of the rendered image; and
an adjusting unit configured to adjust an output of the laser beam based on a detected value of the characteristics detecting laser beam emitted in at least the adjusting area detected by the detecting unit;
wherein the rendered image includes an indicator related to an engine speed of a vehicle to which the image rendering apparatus is applied;
wherein the light source driving unit is configured to control the light source unit to emit the characteristics detecting laser beam in such a way that a scale for the indicator related to the engine speed of the vehicle is rendered within the adjusting area;
wherein the light source unit includes a plurality of laser light sources configured to emit laser light of a plurality of colors; and
wherein the scale comprises a plurality of sectioned areas rendered by the characteristics detecting laser beam in the adjusting area within the rendering area, a color of each respective sectioned area corresponding to a color of the laser light source.

8. The image rendering apparatus according to claim 7, wherein
the light source driving unit is configured to control the light source unit to emit the characteristics detecting laser beam at the position and in the pattern corresponding to the rendered content of the rendered image for the respective laser light sources.

9. The image rendering apparatus according to claim 8, wherein the light source driving unit is configured to control the light source unit to emit the characteristics detecting laser beam with a luminance value based on the input image data.

10. The image rendering apparatus according to claim 7, wherein the light source driving unit controls the light source unit to emit the characteristics detecting laser beam at a position and in a pattern that constitutes a part of the rendered image.

11. A head up display that uses the image rendering apparatus according to claim 7 and presents a rendered image to a user by reflecting an image rendered by the image rendering apparatus by a transparent member.

12. An image luminance adjusting method comprising:
using an image rendering apparatus comprising a light source unit configured to emit a laser beam, a detecting unit configured to detect an intensity of the laser beam, and an optical scanner configured to scan the laser beam emitted from the light source unit in a scan area, the scan area having a rendering area and a blanking area;
controlling the light source unit in such a way that a rendered image based on input image data is generated by the scan of the optical scanner inside the rendering area of the scan area scanned by the optical scanner and not in the blanking area, the rendered image includes an indicator related to an engine speed of a vehicle to which the image rendering apparatus is applied;
controlling the light source unit in such a way that a characteristic laser beam for detecting an intensity of the laser beam to be emitted to at least an adjusting area at a position in the rendering area and in a pattern corresponding to a rendered content of the rendered image;
controlling the light source unit to emit the characteristics detecting laser beam in such a way that a scale for the indicator related to the engine speed of the vehicle is rendered within the adjusting area;
detecting an intensity of the characteristics detecting laser beam; and
adjusting an output of the laser beam based on a detected intensity value of the characteristics detecting laser beam emitted in at least the adjusting area;

wherein the light source unit includes a plurality of laser light sources configured to emit laser light of a plurality of colors; and wherein the scale comprises a plurality of sectioned areas rendered by the characteristics detecting laser beam in the adjusting area within the rendering area, a color of each respective sectioned area corresponding to a color of the laser light source.

\* \* \* \* \*